June 4, 1968 C. E. WATT, JR 3,386,747
LOAD-SUPPORTING DOLLY WITH TRANSVERSE
AND LONGITUDINAL LEVELING MEANS Filed March 18, 1966 2 Sheets-Sheet 1

INVENTOR.
CHARLES E. WATT JR.
BY
Kenway, Jenney & Hildreth

INVENTOR.
CHARLES E. WATT JR.
BY
Kenway, Jenney & Hildreth 3,386,747
LOAD-SUPPORTING DOLLY WITH TRANSVERSE
AND LONGITUDINAL LEVELING MEANS
Charles E. Watt, Jr., Chelmsford, Mass., assignor to Craig Systems Corporation, Lawrence, Mass., a corporation of Massachusetts
Filed Mar. 18, 1966, Ser. No. 535,593
5 Claims. (Cl. 280—6)

ABSTRACT OF THE DISCLOSURE

A dolly for portable equipment which has a first set of jacks for longitudinal leveling and a second set for independent lateral leveling. This permits a frame rigid enough for very heavy equipment because the frame is not required to twist. The first jacks extend between the frame and the load, and maintain a fixed length in transit; while the second jacks extend between the axle and frame and act to distort the suspension springs forcibly for transverse leveling, but are disconnected in transit.

---

This invention relates to a dolly for attachment to portable equipment shelters or other loads, and has as its primary object the provision of an improved dolly which provides independent adjustment of the inclination of the shelter transversely and longitudinally, for levelling the shelter on sloping terrain, and for convenience in loading on aircraft or other vehicles. It is a further object to achieve these capabilities in a dolly which is adapted to transport extremely heavy loads. Additional objects and advantages will appear as the following description proceeds.

Equipment shelters have come into common use, particularly in military operations, for transporting electronic equipment or other delicate gear into the field and providing a weather-protected enclosure for personnel using the equipment. Since trucks of a size to transport such bulky loads are not suitable for use in such environments, recourse has been taken to two-wheeled dollies, one of which is attached to each end of a shelter; the shelter in itself forms the frame of the resulting trailer. The dollies add little to the weight and bulk of the shelter, and the entire unit can readily be transported in military cargo aircraft, and then towed about in the field by the available motor vehicles. In stationary use, it is desirable to support the shelter in a level position, both longitudinally and laterally, although it is parked on uneven terrain. Furthermore, longitudinal tilting capability makes it possible to load or unload the shelter on transport aircraft without the use of cranes, which are frequently unavailable at the loading site.

According to the present invention, a dolly is provided with a substantially rigid frame capable of handling very heavy loads, and this frame is pivoted at an end of the shelter on a fixed axis extending transversely and normally horizontally; an axle is mounted beneath this pivoted frame on heavy-duty springs, preferably of the elliptical type, and a first pair of jacks is connected between the frame and the axle to effect transverse levelling by forcible distortion of the springs. A second independent set of jacks is connected to the load for pivotal movement about a second fixed axis parallel to that of the frame, and is connected to the frame to form triangular truss structures for supporting the frame in normally fixed relation to the load. Longitudinal levelling or tilting for loading purposes is accomplished by adjustment of the second jacks. While the shelter is in transport on the dollies, the second or longitudinal levelling jacks have a fixed length, while the first or transverse levelling jacks are disconnected from the axle for freedom of operation of the load springs.

Several advantages accrue from this construction. Because the longitudinal levelling jacks are not required to provide for transverse axle-tilting and load-levelling, as was the case with previous arrangements, both the frame and these jacks can be pivotally connected to the shelter without provision for transverse play, so that very heavy loads can be safely supported. Furthermore, the independent adjustability of the transverse and longitudinal jacks greatly facilitates the levelling operation on uneven terrain, and makes it feasible to secure solid, equalized support at all four wheels. The transverse levelling jacks lock the springs when the shelter is parked, to eliminate vibration as personnel move about inside the shelter.

While the specification concludes with claims particularly pointing out the subject matter which I regard as my invention, it is believed that a clearer understanding may be gained from the following detailed description of a preferred embodiment, referring to the accompanying drawings, in which:

Figure 1:
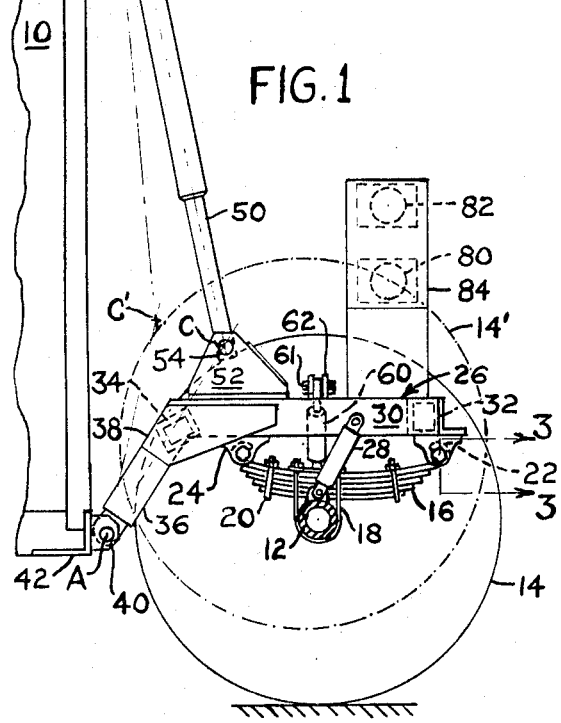
FIGURE 1 is a fragmentary view in side elevation, and partially in section, of a shelter having one of the improved dollies attached at one end.
Figure 2:
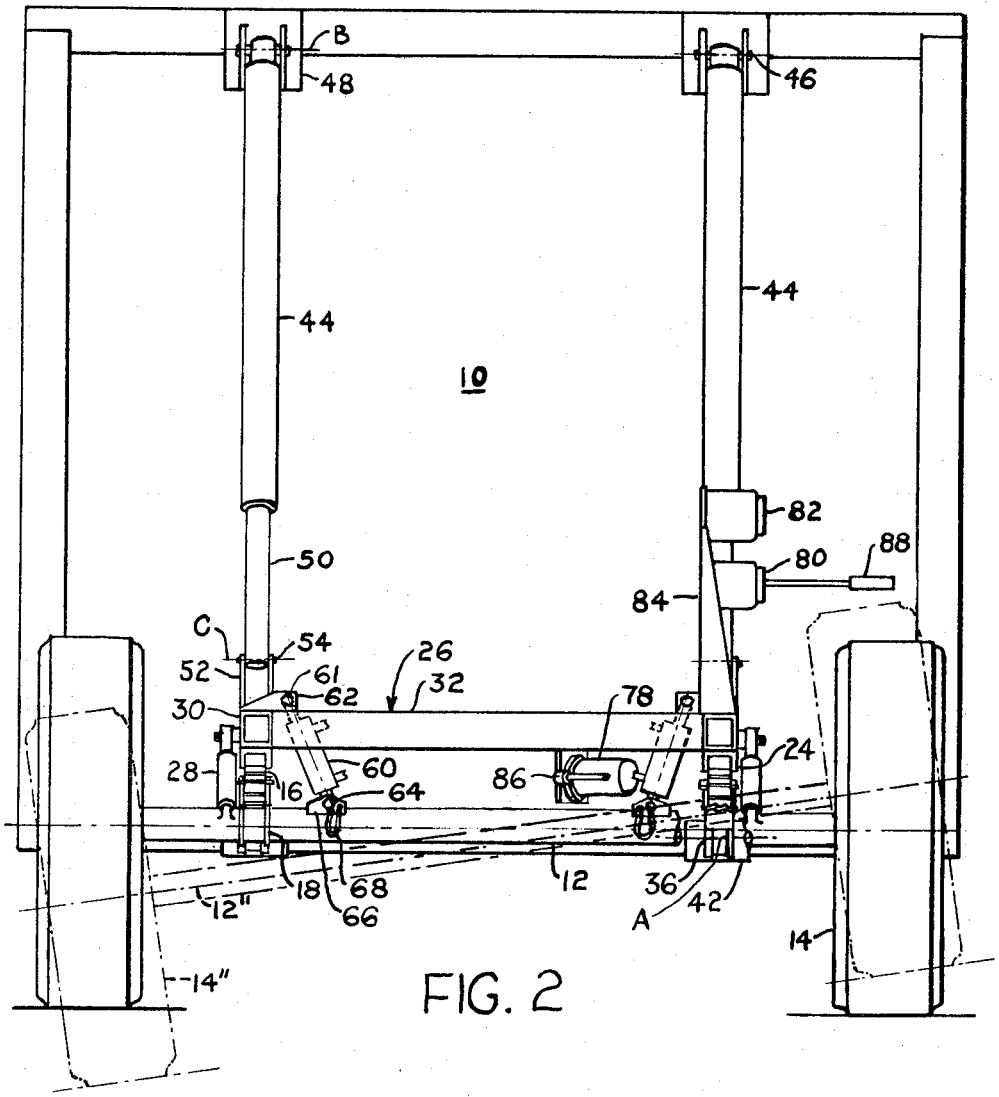
FIGURE 2 is a view in end elevation.

One of the improved dollies is shown in FIGURES 1 and 2 connected to one end of a typical equipment shelter 10. The dolly includes an axle 12 of a conventional type, having a pair of wheels 14 rotatably supported at its ends. The dolly shown is not steerable and would normally be attached to the rear of the shelter, while a similar dolly equipped with a conventional steering axle and tow bar would be attached to the front. The axle is secured to a pair of elliptical leaf springs 16 by shackles 18, and the leaves of each spring are secured together in conventional fashion by shackles 20. The uppermost leaf extends into mounting eyes 22, and these are attached by brackets 24 to a substantially rigid frame 26. Conventional shock absorbers 28 are connected pivotally to the frame and the axle.

The frame 26 includes a pair of longitudinal members 30 connected by transverse channels 32 and 34, and extending into arms 36 secured by braces 38: the entire structure is welded together and is heavy enough to be substantially rigid under the designed load. The arms 36 are mounted on pivot joints 40, each in a mounting bracket 42 which is directly attached to the base of the shelter 10. The pivotal connections 40 allow very little play in any degree of freedom except for rotation about the transverse normally-horizontal axis A, which they define.

The elevation of the frame relative to the shelter is adjustable by means of a pair of longitudinal levelling jacks 44, of a single-acting hydraulic type. The casing of each jack is mounted on a pivot joint 46, each in a bracket 48 secured at the top of the shelter. The structure of the shelter is sufficiently strong to form one leg of a supporting truss, which includes the jacks and frame as second and third legs. The pivot joints 46 define an axis B parallel to the axis A, about which the jacks 44 may swing. The extensible rods 50 of the jacks are each pivotally connected by pivot joints 54 to brackets 52, welded in laterally spaced relation on the frame, to define a third axis C parallel to axes A and B. An adjustable triangular truss is thus formed which permits raising or lowering of the axle 12 and wheels 14 relative to the shelter. A raised position of the wheels is shown at 14' in FIG. 1, with the axis C having moved to a corresponding position C' and the jacks 44 having contracted proportionately, and pivoted to the illustrated centerline.

Figure 6:
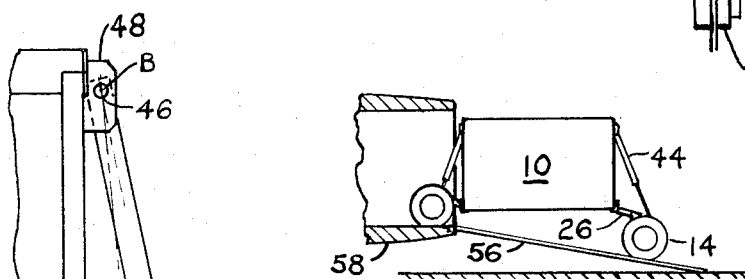
FIGURE 6 is a diagrammatic view showing the longitudinal levelling of the shelter on a loading ramp for an aircraft.

In use, a pair of the dollies may conveniently be attached to a shelter resting on the ground with the jacks 44 fully contracted, so that no external lifting equipment is required. The shelter is preferably provided with shock-absorbing skids (not shown) on its bottom surface for support when the dollies are detached. The jacks 44 are then extended to raise the shelter from the ground. As shown schematically in FIGURE 6, a dolly supporting one end of the shelter may be extended more than that at the other to hold the shelter 10 level as it is run up a loading ramp 56 from ground level into the interior of an aircraft 58, or other vehicle, having a restricted loading entrance. In the illustrated situation, the shelter could not be loaded in a tilted position. Of course the jacks of the rear dolly are lowered as the shelter moves up the ramp and into the aircraft. Longitudinal levelling on uneven terrain can be secured by relative adjustment of the jacks of the two dollies.

Referring again to FIGS. 1–3, transverse levelling is secured by a separate system which includes a pair of double-acting hydraulic jacks 60. These jacks are pivotally mounted in brackets 62, which are welded in laterally-spaced relation each on one of the arms 30 of the dolly. The second ends of these jacks are pivotally connected by means of lock pins 64 (FIGURE 2) in brackets 66 welded to the axle 12. The lock pins 64 are removed when the shelter is to be moved, so that the springs 16 are free to operate, and are secured to the brackets 66 by means of lanyards 68 to avoid loss.

Figure 3:
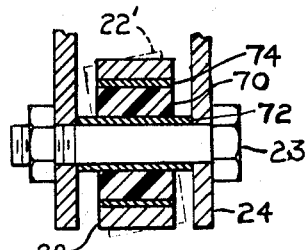
FIGURE 3 is a sectional view taken along line 3—3 in FIGURE 1, looking in the direction of the arrows.

To level the shelter transversely when it is parked, the jacks 60 of each dolly are relatively adjusted to tilt the axle and wheels transversely, as suggested at 12" and 14" in FIGURE 2, to bring the shelter to a level position. The jacks forcibly distort the springs as necessary. In order to avoid twisting the springs about a longitudinal axis, the spring eyes 22 are flexibly mounted in the brackets 24 as shown in FIGURE 3. Each eye is larger than its pivotal fastener 23, and receives a rubber bushing 70 which is bonded to an inner metallic bushing 72 of substantially the same length as the spacing between the ears of the bracket 24. An outer metallic bushing 74 is also bonded to the rubber bushing, but is somewhat shorter in length than the gap between the ears of the bracket to allow the spring and spring eye 22 to twist about a longitudinal axis, as suggested at 22'. Thus, the leaf springs 16 are allowed freedom to cant with the axle in the transverse tilting adustment relative to the frame 26 and shelter 10.

Separate hydraulic systems are provided for the two jacking systems. The jacks 60 are operated by a hydraulic pump and reservoir 78 mounted beneath the frame, while the jacks 44 are operated by a hydraulic pump 80 and reservoir 82 mounted on an upstanding bracket 84 secured to the upper surface of the frame. Operating handles 86 and 88 extend into conveniently accessible positions from the pumps 78 and 80, respectively.

Figure 4:
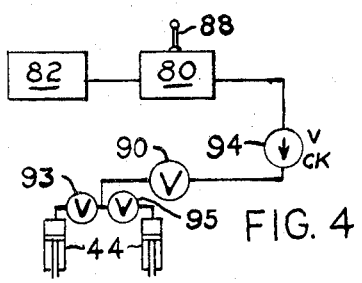
FIGURE 4 is a diagram of a hydraulic circuit for the longitudinal levelling jacks.

Referring now to FIGURE 4, a control system for the jacks 44 extends from the pump 80 in series through a one-way check valve 94 and a shut-off valve 90 to the jacks. This arrangement permits a free flow of pressure fluid to the jacks, while restricting return flow so that a release of pressure lowers the shelter very slowly. Safety shut-off valves 93 and 95 are placed in the lines adjacent the jacks 44, to prevent loss of pressure in the jacks in case of severance of the connecting hoses.

Figure 5:
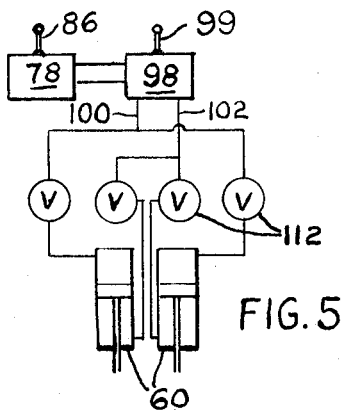
FIGURE 5 is a diagram of a hydraulic circuit for the transverse levelling jacks.

A control circuit for the transverse leveling jacks is shown in FIGURE 5, and includes a four-way valve 98 controlled by a lever 99, for alternately supplying pressure fluid to one of two branched conduits 100 or 102 and exhausting the other. One of the branches of conduit 100 is connected to the upper end of each of the jacks 60, each through a control valve 112, while one branch of conduit 102 is connected to the lower end of each of the jacks, each also through a control valve 112. In use, the control valves associated with only one of the jacks are opened simultaneously to adjust that jack, while the other is stationary. The position of the lever 99 determines whether the operated jack raises or lowers. Of course both jacks could be raised or lowered in unison by opening all four valves 112.

It will be apparent from the foregoing description that the improved dolly provides independently adjustable means for longitudinal and transverse levelling of a shelter, while maintaining the characteristics necessary for transporting heavy loads. While I have described preferred embodiments of my invention by way of illustration, it will be apparent to those skilled in the art that various changes and modifications may be made therein without departing from the true spirit and scope of the invention, which I therefore intend to define in the appended claims without limitation to the details of the foregoing embodiments.

What I claim is:

1. Dolly means for portably supporting a load at adjustable longitudinal and lateral angles relative to a supporting surface, comprising:

a pair of axles adapted to mount wheels rotatably thereon;

a pair of substantially rigid frames having means for pivotal connection in longitudinally-spaced relation to the load, for arcuate movement about parallel normally-horizontal first axes transverse to the load;

spring means mounting one of said axles on each of said frames in normally-parallel relation to said first transverse axes;

two pairs of first jack means having means for pivotal connection each pair between one of said frames and the corresponding one of said axles, said first jack means being constructed and arranged to distort said spring means forcibly and thereby tilt said axles independently about second normally-horizontal axes longitudinal to the load, for levelling the load transversely on an uneven surface;

and two pairs of second jack means each pivotally connected to one of said frames, and each having means for pivotal connection to the load for angularly positioning said frames and axles independently about said first transverse axes to level the load longitudinally on an uneven surface.

2. A dolly as recited in claim 1, in which said spring means comprise leaf springs extending longitudinally of said load, together with resilient means securing said springs to said frame and being constructed and arranged to provide for tilting movement of said springs with said axle as said axle is tilted about said second axis in levelling the load transversely.

3. A dolly as recited in claim 1, together with first actuating means constructed and arranged for selectively actuating said pair of first jack means individually for transversely levelling the load, and second actuating means constructed and arranged for selectively actuating said second jack means in unison for levelling the load longitudinally.

4. A dolly as recited in claim 3, said first and second jack means being hydraulically actuable, said first actuating means comprising first selectively-operable pressure fluid supply means constructed and arranged for supplying pressure fluid to either of said first jack means individually for levelling the load transversely; and said second actuating means comprising second selectively-operable pressure fluid supply means constructed and arranged for supplying pressure fluid to each of said second jack means in parallel for levelling the load longitudinally.

5. A dolly for portably supporting a load at adjustable longitudinal and lateral angles relative to a supporting surface, comprising:
   an axle adapted to mount wheels rotatably thereon;
   a substantially rigid frame having means for pivotal connection to the load for arcuate movement of said frame about a first normally-horizontal axis transverse to the load, said means restraining said frame against tilting about a second normally-horizontal axis longitudinal to the load;
   spring means mounting said axle on said frame in normally-parallel relation to said first transverse axis;
   a pair of first jack means spaced apart laterally of the load and having means for pivotal connection to said frame and said axle, said first jack means being constructed and arranged for independent actuation to distort said spring means forcibly and unequally and thereby tilt said axle relative to said frame about said second axis for leveling the load transversely on an uneven surface;
   and a pair of second jack means spaced apart laterally of the load, pivotally connected to said frame, and having means for pivotal connection to the load for angularly positioning said frame and axle about said first axis to level the load longitudinally on an uneven surface.

References Cited
UNITED STATES PATENTS

| | | | |
|---|---|---|---|
| 3,315,974 | 4/1967 | Weaver | 280—35 X |
| 3,189,363 | 6/1965 | Pierrat | 280—35 |
| 3,103,368 | 9/1963 | Erickson | 280—30 X |

PHILIP GOODMAN, *Primary Examiner.*